May 18, 1937.  J. M. HARALDSON  2,080,711
VEHICLE JACK
Filed Sept. 23, 1935
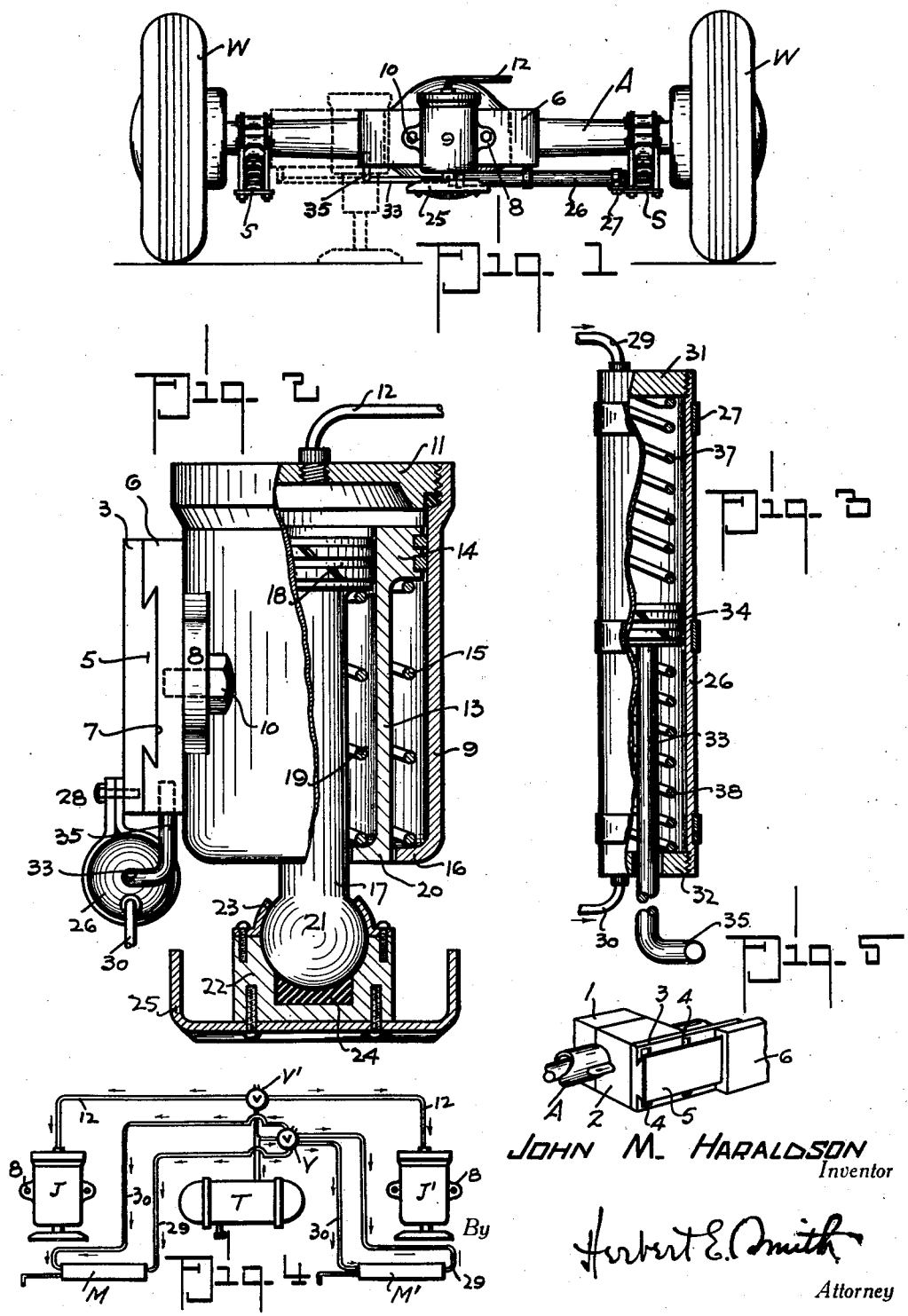
JOHN M. HARALDSON
Inventor
Herbert E. Smith
Attorney Patented May 18, 1937

2,080,711

UNITED STATES PATENT OFFICE 2,080,711

VEHICLE JACK

John M. Haraldson, Spokane, Wash.

Application September 23, 1935, Serial No. 41,744

1 Claim. (Cl. 254—86)

My present invention relates to improvements in vehicle jacks of the type mounted on both, or either, of the front and rear axles of a motor vehicle or automobile, and power-operated, as by compressed air, from a supply tank also mounted on the vehicle.

In carrying out my invention I utilize a telescoping power-jack, preferably one on each axle of the vehicle, and these jacks are mounted in such manner that they may be laterally shifted, or adjusted transversely of the vehicle, in order that the weight of the vehicle to be lifted may be equalized with relation to the jack, and in order to avoid obstructions in the use of the jack.

Each jack is equipped with a servo-motor utilizing motive fluid pressure, as compressed air, for laterally shifting the jack; and means are provided for automatically adjusting the base or foot of the jack to the ground or floor surface.

The invention consists in certain novel combinations and arrangements of parts as will hereinafter be more fully set forth and claimed. In the accompanying drawing I have illustrated one complete example of the physical embodiment of my invention wherein the parts are combined and arranged according to one mode I have thus far devised for the practical application of the principles of my invention. It will be understood, however, that changes and alterations may be made in the exemplifying structures, within the scope of my claim, without departing from the principles of the invention.

Figure 1 is an elevation showing the rear axle and wheels and other parts of an automobile equipped with the device of my invention, and showing by dotted lines a laterally shifted position of the jack when in use.

Figure 2 is an enlarged detail view partly in section showing one of the jacks retracted, together with the adjustable mount and servo-motor for the jack.

Figure 3 is a view of the servo-motor, partly broken away to disclose its interior arrangement.

Figure 4 is a diagrammatic arrangement of the two jacks and their servo-motors for the front and rear axles of an automobile, together with the supply tank for compressed air, and the control valves for the jacks and servo-motors respectively.

Figure 5 is a detail perspective view of a portion of the means for mounting a jack on an axle.

In the diagrammatic Figure 4, the two jacks are designated J and J'; the two motors M and M'; the supply tank for compressed air is indicated as T; the valve V controls the supply of motive fluid to the motors and the valve V' controls the supply of motive fluid to the two jacks.

Inasmuch as the equipment for both the front and rear axles of an automobile are the same, the description of the jack and its mounting for the rear axle will suffice for both equipments involving my invention. In Figure 1 where the wheels W, axle A and springs S are illustrated, the jack and its mount are attached to the axle A through the use of a split supporting block comprising two sections 1 and 2 that enclose the axle and are rigidly fastened thereto in suitable manner. An attaching plate 3 is bolted at 4 to the block, and this plate is fashioned with a horizontally extending dove-tail tongue 5. A slide plate 6 having a complementary dove-tail groove 7 in one of its faces is slidably mounted on the fixed attaching plate, for lateral adjustment of the jack, which jack had attaching flanges 8 on its main exterior cylinder or barrel 9, and bolts 10 rigidly join the jack with the slide plate.

The main cylinder or barrel of the jack is open at the bottom, but its upper end is closed by a head 11, which has an air inlet pipe 12 connected thereto to admit compressed air to the jack from the tank T under control of the valve V'.

A second, inner cylinder 13 telescopes within the outer or main barrel of the jack, and this inner cylinder has an exterior piston-head 14 engaging the bore of the barrel. A return, or lifting spring 15 is coiled about the exterior of the telescoping cylinder and interposed between the piston head and an inner annular flange 16 at the bottom of the outer barrel, which spring lifts the inner telescoping cylinder when pressure is released from the upper end of the outer barrel, and the spring holds the inner cylinder in uplifted position.

Within the inner cylinder is arranged a telescoping plunger stem 17 having at its upper end a piston head 18 slidable in the bore of the inner cylinder, and adapted to receive air pressure, with the piston-head 14, against its upper face, for downwardly projecting the inner cylinder and the plunger-stem of the jack, to lift, and to support the vehicle in uplifted position.

Another retracting spring 19 is coiled about the plunger stem, and interposed between the head 18 of the stem and an interior, annular flange 20 fashioned at the lower end of the inner telescoping cylinder, for lifting, and for holding uplifted, the plunger-stem in the absence of motive fluid pressure in the upper end of the main barrel of the jack.

The lower end of the plunger-stem projects downwardly through the open end of the inner telescoping cylinder, and this projecting end is fashioned with a spherical head or ball 21, loosely seated in a bearing block 22 having a flange-ring or cap 23 bolted on the block for the purpose of suspending the block from the spherical head or ball.

Within the bearing block and seated in a recess therein, a friction pad 24, of rubber or other suitable material, is provided, as an anti-rattling device. The pad of resilient material is somewhat compressed to afford a frictional engagement with the ball and thereby tighten the loose fit of the bearing block on the ball when the jack is not extended, and the pad also forms a cushion for the projected plunger-stem when the jack is extended. A foot plate or base 25 is bolted to the bearing head or bearing block, and the base, with its block and retaining flanged-ring form a swivel head for the jack that readily adjusts itself to irregularities on the floor or ground when the jack is extended to lift the vehicle.

The servo-motors M and M' are designed to facilitate lateral adjustment of the jacks, under motive fluid pressure, by sliding the jacks and their attached slide plates on the attaching plates.

Each of the servo-motors comprises a horizontally disposed cylinder 26 attached at one end, as at 27, to a spring bracket or other suitable support, and also bolted, as at 28 by a clamping band to the plate 3, thereby rigidly holding the cylinder in stationary position, below the axle, and also below the horizontally disposed attaching plates or mount for the jack.

The cylinder 26 has two air inlet pipes 29 and 30, at its opposite ends and these pipes receive compressed air from the tank T under control of the valve V, which valve controls, alternately, admission of compressed air for power to the opposite ends of the cylinder, through the two heads 31 and 32.

A piston-stem 33 is reciprocable in the cylinder and in its head 32, which has an opening therein to accommodate the stem, and within the cylinder the stem is fashioned with a piston head 34 located in neutral position at the approximate longitudinal center of the cylinder.

The exterior end of the piston-stem, which projects through the cylinder head 32, is bent upwardly at 35, and rigidly anchored or fastened in suitable manner at 36 to the slide plate 6, so that these two elements, rigidly joined together, may move in unison for lateral adjustment of the jack. At opposite sides of the piston head 34 are located springs 37 and 38 interposed between the piston head and the cylinder heads, one of which, after being compressed under air pressure at the opposite side of the piston head, returns the piston head to neutral position when the air pressure is released from the interior of the cylinder.

Thus it will readily be apparent that the jack in Figure 1 may readily be projected, or extended, under power of compressed air from the tank T by manipulation of the valve V'. Or, if it is necessary to equalize the weight of the vehicle, the retracted jack may be moved laterally from full line position to the dotted line position of Figure 1, under power of compressed air by manipulation of the valve V. Then, after the jack is in proper position, the valve V' is manipulated to extend the telescoping parts, by compressed air, to elevate the rear end of the vehicle from the ground or floor. The vehicle is lowered to the ground by manipulation of the valve V' to release the air pressure, and the two coiled springs within the jack retract the telescoping parts of the jack. The retracted jack is then returned to its central position with relation to the vehicle by manipulation of the valve V, which releases the pressure in the cylinder of the servo-motor, and the compressed spring pushes the piston-head to its neutral position. In some instances the valve V may be manipulated to release air pressure from one end of the cylinder of the servo-motor, and to admit air to the opposite end of the cylinder, thereby returning the jack to its central position under air pressure.

Having thus fully described my invention, what I claim as new and desire to secure by Letters Patent is:—

In a vehicle jack, the combination with a telescoping jack having a swiveled base member and a supporting member rigid with the jack, of a fixed support on the vehicle, said supporting member supported by and slidable on the fixed support, a compressed-air tank and supply pipes therefrom, control valves for said pipes, one of said pipes connected with said jack, a servo-motor, and an air pipe connected with said motor for moving said supporting member.

JOHN M. HARALDSON.